Figure 6:
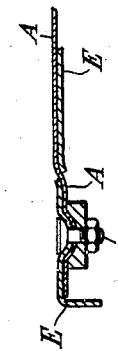

Dec. 7, 1948.  B. N. WALLIS  2,455,838
AIRFRAME STRUCTURE
Filed June 15, 1945  4 Sheets-Sheet 1
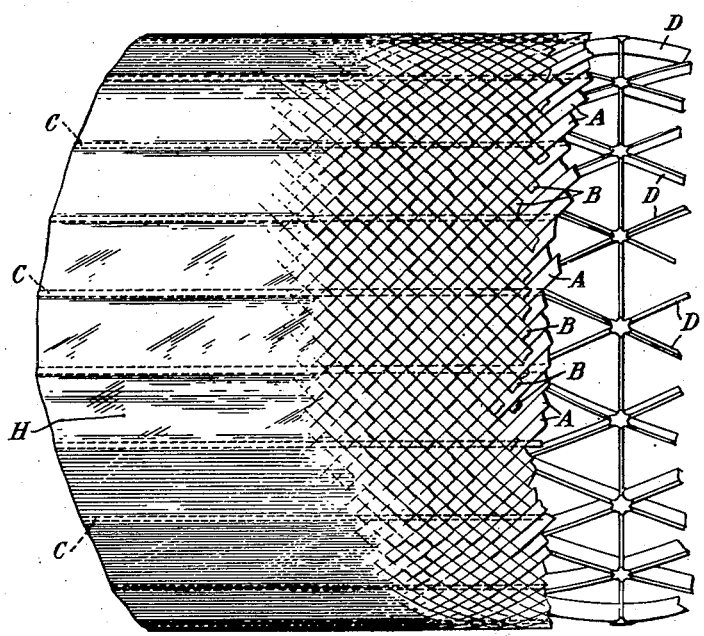
Fig. 1.
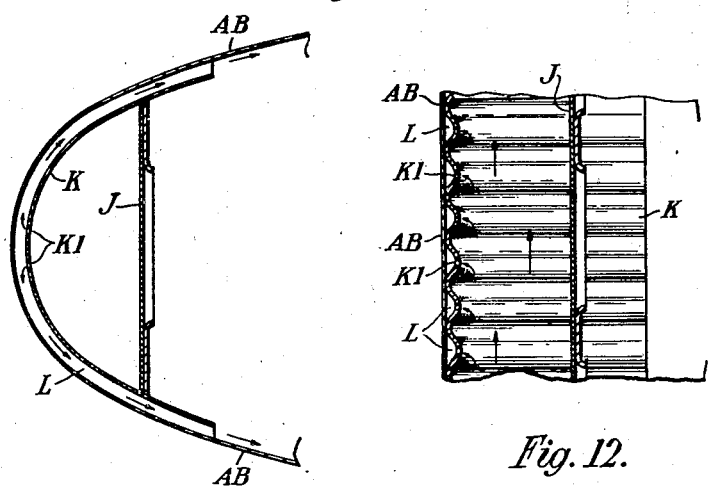
Fig. 11.
Fig. 12.
Inventor
B. N. Wallis
By Watson, Cole, Grindle & Watson Dec. 7, 1948. B. N. WALLIS 2,455,838
AIRFRAME STRUCTURE
Filed June 15, 1945 4 Sheets-Sheet 2
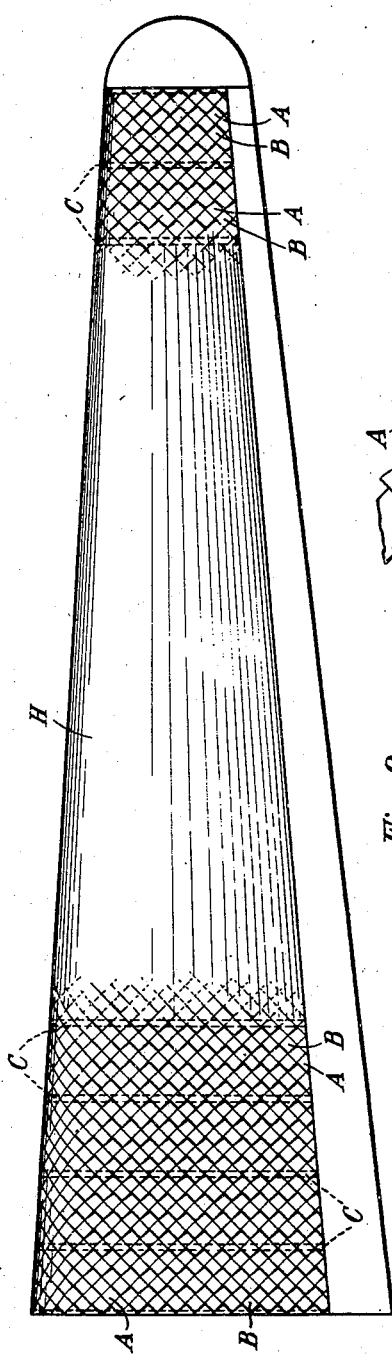
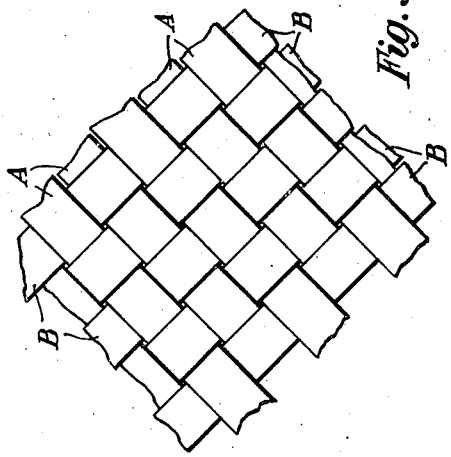

Dec. 7, 1948.  B. N. WALLIS  2,455,838
AIRFRAME STRUCTURE
Filed June 15, 1945  4 Sheets-Sheet 3

Inventor
B. N. Wallis
By Watson, Cole, Grindle & Watson

Dec. 7, 1948.   B. N. WALLIS   2,455,838
AIRFRAME STRUCTURE

Filed June 15, 1945   4 Sheets-Sheet 4

Inventor
B. N. Wallis
By Watson, Cole, Grindle
      & Watson

Patented Dec. 7, 1948

2,455,838

UNITED STATES PATENT OFFICE 2,455,838

AIR FRAME STRUCTURE

Barnes Neville Wallis, Weybridge, England, assignor to Vickers-Armstrongs Limited, Westminster, London, England Application June 15, 1945, Serial No. 599,668
In Great Britain June 19, 1944

8 Claims. (Cl. 244—117)

It is well-known that in the construction of a space-containing frame having an outer clothing or skin the most favourable position in which to put the material composing the structure is at the surface thereof, where it will not only give the greatest strength and stiffness for its weight but also provide the necessary covering. Where, however, as in aeronautical engineering, the strength/weight ratio of a structure is of primary importance, the skin type of construction is inherently inefficient due to the incapability of thin sheet metal to resist loads in compression and shear (including torsion) without break-down of the compressive stability of the material, and consequent surface wrinkling. In aircraft intended to fly at high speeds the preservation of laminar air flow over the body and wings is so important that even very minute wrinkles of the surface cannot be tolerated, and although slightly curved plating can be stabilised sufficiently to prevent wrinkle-formation by rigidly attaching the plating to a closely pitched network of stiffening members on its inner surface, or by increasing the thickness of the plating, either expedient results in a relatively poor strength/weight ratio of the structure.

Another problem arises in connection with the external clothing of geodetic or articulated aircraft structures. The textile fabric which has hitherto been used for this purpose, upon which the sustentation of the aircraft depends during flight, is disadvantageous inasmuch as the material is fragile and liable to accidental damage and contributes nothing to the strength or stiffness of the main structure, whilst certain difficulties are experienced in maintaining the required outward form of the structure under lateral atmospheric pressures taken in conjunction with the variable deflection of the skeletal structure due to changes in operational loading. An attempt to obviate this disadvantage in a geodetic structure by the use of a more rigid form of covering material (e. g. a thin skin of metal plating, plastic material or plywood) results in the formation of unstable wrinkles which are even more pronounced than those experienced in stressed-skin construction, owing to the greater flexural movement which necessarily accompanies the higher working stresses attained in the individual frame members; the expedient of increasing the thickness of the plating, to a degree such that it becomes the dominant factor in the stiffness and strength of the structure as a whole, would obviously stultify the use of the articulated skeleton supporting it. No practicable method has been devised for stretching a continuous skin of rigid material to a sufficiently high tension relative to the stresses which may be induced by external loading of the skeletal structure; to do this the thickness of the plate or sheet would have to be so small as to render it too susceptible to deflection under loads acting normal to the surface.

The present invention is directed to the provision of a novel form of material which, while avoiding the great weight of the known stressed-skin construction, will serve as a covering for a geodetic or other type of articulated structure and will be capable of assuming within negligible limits of error any desired formation in spherical curvature and also of being stressed in such manner that a high degree of torsional rigidity can be exacted from the skin itself, thus enabling the skin to contribute substantially to the strength and rigidity of the internal skeleton. A secondary object of the invention is the provision of an improved method of fabricating the skin of an airframe structure in situ.

According to the invention a skin-like covering material for the said purpose is composed of thin metal ribbons or strips interlaced or interwoven to form a flexible fabric which may be stretched over and attached to the airframe structure. The fabric skin is preferably capable of being stressed by tautening the constituent ribbons. The metal ribbons are divided into two or more systems, each having its components closely arranged in parallel, the systems being interlaced after the fashion of the warp and weft of a woven fabric, so that the surface of the interlaced material is substantially continuous and capable of having a smooth aerodynamic finish imparted to it by successive applications of a suitable paint or like sealing medium by coating or spraying, each application being rubbed down with a fine abrasive until the desired degree of smoothness is attained.

Figure 5:
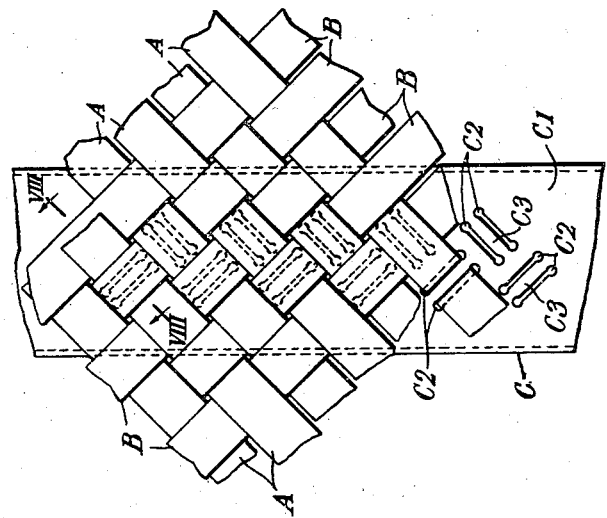
Figure 4:
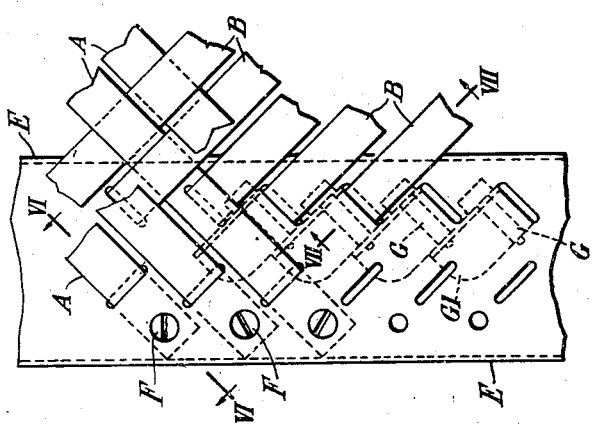

The application of the invention to airframes of the geodetic type is hereinafter described by way of example with reference to the accompanying drawings. In said drawings Fig. 1 is a fragmentary elevation of a part of an aeroplane fuselage and Fig. 2 is a plan of an aeroplane wing; in both cases the outer skin is fashioned in accordance with the method characterising the present invention. Fig. 3 is a plan of a portion of the interlaced metal ribbon skin shown separately. Figs. 4 and 5 are fragmentary plan views showing one method of attachment of the skin-forming ribbons respectively to the terminal and intermediate members of the supporting structure.

Figure 7:
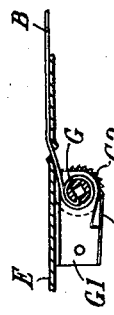
Figure 8:
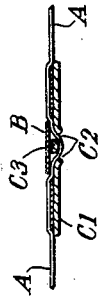
Figures 9, 10:
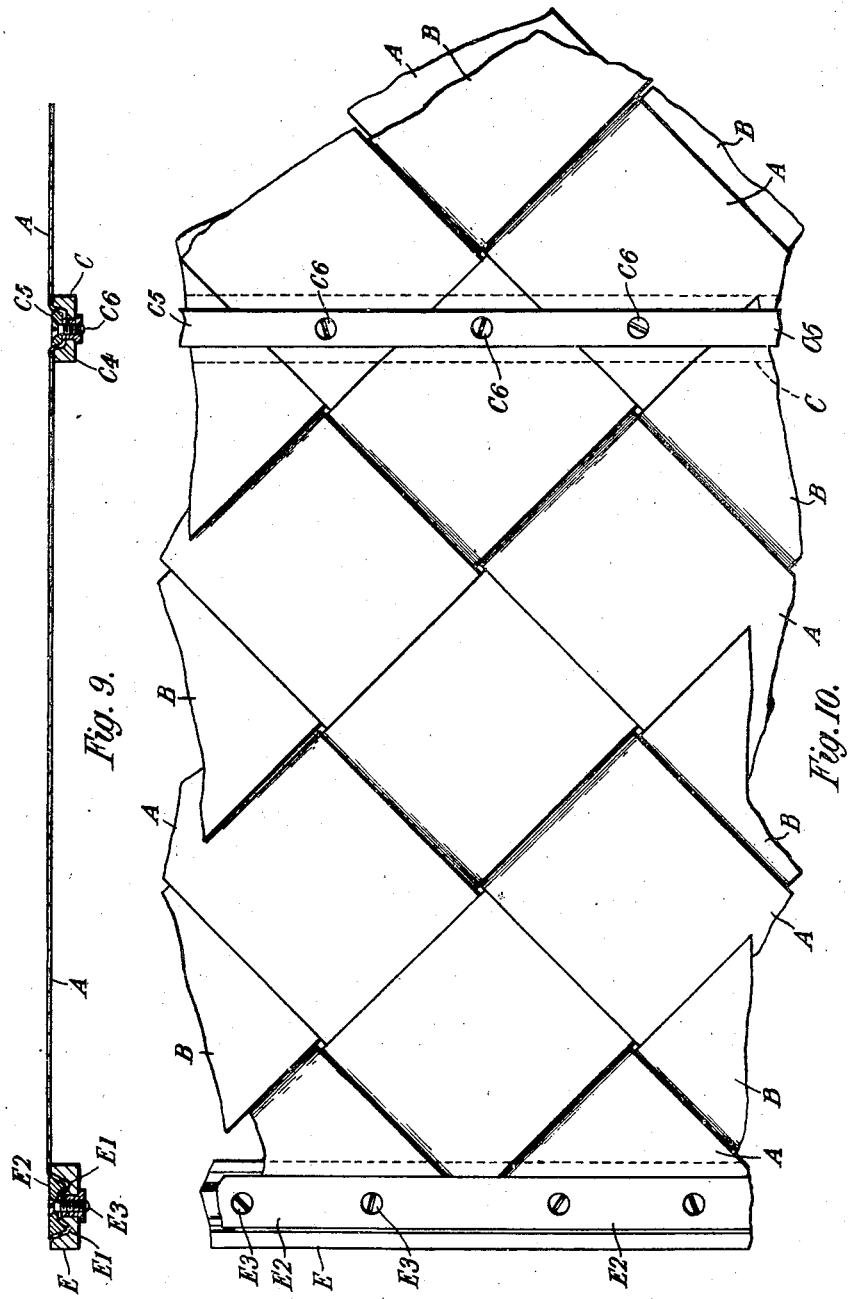

Figs. 6 and 7 are sections taken respectively on the lines VI—VI and VII—VII of Fig. 4, and Fig. 8 is a section taken on the line VIII—VIII of Fig. 5. Figs. 9 and 10 are fragmentary views respectively in section and plan showing an alternative method of attachment of the skin to the terminal and intermediate members of the supporting structure. Figs. 11 and 12 are respectively vertical and horizontal sections illustrating the manner in which the skin covering provided in accordance with the invention is supported around the leading edge of a wing.

The metal skin provided by the invention is conveniently fabricated on the structure, each ribbon being laid in place and attached in its position in turn. In order that the ribbons may be pre-tensioned to a high degree, by the methods hereinafter described, they should be made of a high tensile steel. Corrosion can be avoided by using ribbons of stainless steel, which material has the additional advantage of being non-magnetic.

In the embodiments illustrated in the drawings, the skin is composed of two systems of ribbons, indicated respectively by the reference letters A, A etc. and B, B etc. The ribbons of the two systems are interlaced so as to lie in close parallel arrangement, the whole constituting an interlaced or woven fabric having a substantially continuous surface. A fragment of such fabricated skin is shown separately in Fig. 3.

Where, as in the examples illustrated in Figs. 1 and 2, the skin is applied to an airframe of the geodetic type, the ribbons A, B may be stretched over light stringers C which are supported in spaced parallel chordwise arrangement upon the geodesics D. As will be understood, it is possible, by spacing the chordwise stringers C sufficiently closely, to produce a multi-faceted surface approximating to a spherical curvature as nearly as may be desired. One element of the curvature, e. g. that revealed by a chordwise section in the case of a wing, or a longitudinal section in the case of a fuselage, is dictated entirely by the shape of the stringers, whilst the other element of the curvature, viz. that revealed by a spanwise section in the case of a wing or a transverse section in the case of a fuselage, can be controlled by adjusting the degree of flatness between the stringers by the distension of the ribbon-surface under the outwardly directed resultant pressure.

The attachment of the interlaced skin to the structure, and the operation of pre-stressing the constituent ribbons A and B thereof, are hereinafter more particularly exemplified with reference to a wing covering. It will be understood that similar methods may be applied to the skin of a fuselage or of the elevator, fin or other movable control surfaces.

In the case of a wing, each component ribbon A or B may pass continuously from an attachment at the trailing edge of the upper surface, around the nose of the leading edge, to an attachment at the trailing edge of the lower surface, and it is convenient to provide means for adjusting at least one of such attachments in order that the tension of the ribbons may be regulated to the requisite degree. A method of supporting the skin AB at the requisite curvature in its passage around the leading edge of the wing is hereinafter described with reference to Figs. 11 and 12.

One means of attaching the interlaced skin fabric to the chordwise supporting stringers C is depicted in Figs. 5 and 8. Said stringers are of channel-section, and the web C1 is pierced by two rows of inclined slots C2, arranged in staggered pairs, so that each ribbon, as it crosses a stringer, may be secured in position thereon by being looped under the portion C3 which lies between a pair of said slots C2.

An alternative method of attaching the skin to the stringers C is shown in Figs. 9 and 10. In this case the stringers are formed with a longitudinal recess C4 in the upper surface, and battens C5 are used to press the ribbons, where they cross the stringer, into the depths of said recess, the battens C5 being finally held in place by screws and nuts C6 as shown.

In Figs. 4, 6 and 7 the reference letter E indicates a terminal stringer. The ribbons A, A etc. are attached at their ends to said member E by means of clamping means F, F, in the manner shown in Fig. 6, and in relation to each ribbon B there is provided a small rotary spool G mounted in a fixed bracket G1 in a position inclined to the member E so that the axis of rotation of said spool G is perpendicular to the axis of the ribbon B. The end of each ribbon B is passed through a slot in a spool G so that the ribbon may be tautened throughout its length when the spool is rotated by a convenient key or spanner fitting on the squared end of the spool. A ratchet wheel G2 is fixed to the axle of each spool G and arranged to cooperate with a suitable pawl or detent G3 in such manner as to hold the spool when tightened.

Attaching and tensioning means similar to those illustrated in Figs. 4, 6 and 7 may be employed at the trailing edge longérons, the ribbons B being attached to adjusting spools G on the upper surface of the wing and the ribbons A being attached to adjusting spools G on the lower surface of the wing.

A simpler and (in some cases) more convenient method of attaching the ends of the ribbons A and B to the terminal frame-member E (or trailing-edge longéron) is shown in Figs. 9 and 10. Here the member E is made with a double longitudinal recess E1 into which the ends of the ribbons A and B are pressed by means of a conformably shaped batten E2 which is held in place by means of screws and nuts E3. The action of tightening down said batten E2, and also the battens C5 of the intermediate stringers C where these latter battens are used, serves to stretch the ribbons tightly across the structure, and it will be evident that by suitably proportioning the overall lengths of the ribbons to the linear distance between the points at which the ends of the ribbons are attached to the longérons on the upper and lower surfaces of the wing, the appropriate degree of tension in the ribbons may be obtained.

The invention is especially applicable to such airframe structures, e. g. wings, tail-planes and fins, as are provided with de-icing equipment of the known kind in which the heating medium (hot air or exhaust gases) is conducted through a plenum or duct, enclosed within the leading edge of the structure. Such an arrangement is illustrated in Figs. 11 and 12 of the drawings, wherein the reference J indicates a bulk-head and K a liner of corrugated metal plating. Said members J and K enclose the duct through which the hot air or gases pass. The liner K is pierced at K1 to admit the heating medium unto the cavities L, L, whereby it is positively directed into intimate contact with the inner surface of the outer skin AB at the leading edge. In such a case, the interlaced ribbons A and B are passed over and around the said pierced corrugated liner K, in contact with the upstanding parts of the corrugations thereof, so that the inner surface of the skin AB cooperates with the liner to constitute the cavities L as aforesaid. The liner K also serves to support the skin AB in the desired curved formation.

After the complete skin has been affixed in position and tensioned, a succession of coatings or sprayings of a plastic sealing paint, such as polyvinyl chloride or metallic aluminium or the like, is applied over the outer surfaces of the interlaced ribbons A and B, each coating or spraying being rubbed down with a fine abrasive before the next is applied, until a hard, smooth finish is achieved. The finished skin is depicted at H in Fig. 1. Such a skin will be waterproof, fireproof and capable of a substantial degree of flexure under the working of the structure without cracking or flaking.

Although it would be possible to arrange the interlaced skin with one system of the component ribbons extending in the direction of the longérons and the other system disposed chordwise, it is preferred by reason of the torsional rigidity thereby provided that the skin material be disposed in the surface at an angle to the longitudinal axis of the basal structure. Conveniently, in a skin composed of two systems of metal ribbons interlacing at right angles to each other, said skin is so applied to the structure that each system of ribbons lies at an angle of 45° to the longitudinal axis thereof.

By arranging the skin with its component ribbons at an angle to the longitudinal axis of the structure, and by tautening the ribbons to an appropriate degree, the skin is made to contribute considerably to the torsional rigidity of the entire structure, thereby affording a valuable increase in the efficiency of the skeleton frame owing to the consequent possibility of reducing the weights of its component members.

In the aforementioned alternative embodiment of the invention, in which the ribbon-systems are respectively arranged in longitudinal and chordwise directions, only the longitudinal ribbons are tensioned. As before, these will be made of high tensile steel, but the chordwise ribbons may be of a lightweight metal such as Duralumin (registered trade-mark). In this arrangement the longitudinal ribbons will conform throughout their length to the surface swept by the generators, and a nearly spherical curvature is obtained.

What I claim as my invention and desire to secure by Letters Patent is:

1. An airframe structure comprising a skeletal framework which includes a plurality of spaced chordwise stringers, a skin-like covering applied to said framework, said covering comprising thin metal ribbons interwoven after the fashion of the components of a woven fabric, and means for securing said covering to certain of said stringers, said last named means comprising a plurality of pairs of parallel slots formed in the stringers, through each respective pair of which one of the ribbons comprising the covering is threaded.

2. An airframe structure comprising a skeletal framework work includes a plurality of spaced chordwise stringers, a skin-like covering applied to said framework, said covering comprising two systems of thin metal ribbons interlaced at right angles to each other after the fashion of the components of a woven fabric, and disposed so that each ribbon lies at substantially a 45° angle to said stringers, and means for securing said covering to certain of said stringers, said last named means comprising two series of pairs of parallel slots formed in the stringers, through each respective pair of which one of the ribbons comprising the covering is threaded, the slots of one of said series of pairs being disposed at angles of 45° with the length of the stringers and receiving the ribbons of one system, and the slots of the other series being disposed at right angles to the slots of the first named series and receiving the ribbons of the second system.

3. An airframe structure which comprises a skeletal framework including a terminal member, a skin-like covering applied to said framework which covering comprises thin metal ribbons interlaced after the fashion of the components of a woven fabric, the ends of at least some of the ribbons being adjacent said terminal member, means for securing said ribbons to said frame work and adjusting the tension thereof, said means comprising spools mounted for rotation on said terminal member, the ends of said ribbons being wound respectively upon said spools, means for rotating said spools to impart the required degree of tension to the ribbons comprising the covering, and detent means for retaining said spools in their adjusted positions with the ribbons under tension.

4. An aeroplane wing comprising a skeletal framework including a trailing-edge longéron on the upper surface and a trailing-edge longéron on the lower surface, a skin-like covering for said wing comprising a plurality of thin metal ribbons interlaced after the fashion of the components of a woven fabric, certain of the ribbons composing the covering terminating adjacent to and being secured to the trailing-edge longéron on the upper surface and extending forwardly along the upper surface of the wing, around the nose of the leading edge of the wing, and along the lower surface thereof, and the opposite ends of said ribbons being secured to the trailing-edge longéron on the lower surface of the wing.

5. An aeroplane wing comprising a skeletal framework including a trailing-edge longéron on the upper surface and a trailing-edge longéron on the lower surface, a skin-like covering for said wing comprising two systems of thin metal ribbons interlaced after the fashion of the components of a woven fabric, the ribbons of the respective systems being disposed at right angles to each other and at angles of substantially 45° with the major horizontal axes of the wing, ribbons of each system terminating adjacent to and being secured to the trailing-edge longéron on the upper surface and extending diagonally forwardly along the upper surface of the wing, around the nose of the leading edge of the wing, and diagonally along the lower surface thereof, and the opposite ends of said ribbons being secured to the trailing-edge longéron on the lower surface of the wing.

6. In an airframe construction, which includes a skeletal framework or substructure, in combination, a flexible outer skin applied to said substructure, said skin comprising two or more systems of thin metal ribbons interlaced after the fashion of the components of a woven fabric, but relatively movable with respect to each other to accommodate any differential tautening of the ribbons of the respective systems, the component ribbons being disposed closely together to form a substantially continuous surface, and means forming a permanent part of the construction for applying and maintaining tension in said skin in both of two directions in the plane thereof.

7. In an airframe construction, which includes a skeletal framework or substructure, in combination, a flexible outer skin applied to said substructure, said skin comprising two or more systems of thin metal ribbons interlaced after the fashion of the components of a woven fabric, but relatively movable with respect to each other to accommodate any differential tautening of the ribbons of the respective systems, said component ribbons being disposed closely together to form a substantially continuous surface, the ribbons of each of said systems being disposed at an angle of approximately 90° with the ribbons of the other system and at an angle of approximately 45° with the longitudinal axis of the construction, and means forming a permanent part of the construction for applying and maintaining tension in said skin in both of two directions in the plane thereof.

8. In an airframe construction, which includes a skeletal framework or substructure, in combination, a flexible outer skin applied to said substructure, said skin comprising two or more systems of thin metal ribbons interlaced after the fashion of the components of a woven fabric, but relatively movable with respect to each other to accommodate any differential tautening of the ribbons of the respective systems, said component ribbons being disposed closely together to form a substantially continuous surface, the ribbons of each of said systems being disposed at an angle of approximately 90° with the ribbons of the other system and at an angle of approximately 45° with the longitudinal axis of the construction, and means forming a permanent part of the construction for applying and maintaining each of the ribbons comprising said systems individually under tension in directions longitudinally of said ribbons.

BARNES NEVILLE WALLIS.

REFERENCES CITED

The following references are of record in the file of this patent:

UNITED STATES PATENTS

| Number | Name | Date |
|---|---|---|
| 1,243,041 | Clark | Oct. 16, 1916 |
| 1,322,348 | Rosenhain et al. | Nov. 18, 1919 |
| 1,409,982 | Walen | Mar. 21, 1922 |
| 1,426,626 | Belcher | Aug. 22, 1922 |
| 1,717,390 | Kucher | June 18, 1929 |
| 1,985,649 | Wallis | Dec. 25, 1934 |
| 2,344,131 | Coryell | Mar. 14, 1944 |

FOREIGN PATENTS

| Number | Country | Date |
|---|---|---|
| 125,669 | Great Britain | May 1, 1919 |
| 142,082 | Great Britain | May 1, 1921 |
| 264,546 | Great Britain | Jan. 25, 1927 |
| 479,839 | Great Britain | Feb. 8, 1938 |